United States Patent
Sriram et al.

(12)

(10) Patent No.: US 6,600,843 B2
(45) Date of Patent: Jul. 29, 2003

(54) OPTICAL MODULATOR (75) Inventors: Sriram S. Sriram, Powell, OH (US); Stuart A. Kingsley, Bexley, OH (US)

(73) Assignee: Srico, Inc., Columbus, OH (US)

( * ) Notice: Subject to any disclaimer, the term of this patent is extended or adjusted under 35 U.S.C. 154(b) by 0 days.

(21) Appl. No.: 10/099,173

(22) Filed: Mar. 13, 2002

(65) Prior Publication Data

US 2002/0131665 A1 Sep. 19, 2002

Related U.S. Application Data (60) Provisional application No. 60/275,444, filed on Mar. 13, 2001.

(51) Int. Cl.[7] .............................................. G02F 1/035
(52) U.S. Cl. .................. 385/2; 385/4; 385/8; 385/9; 385/14; 385/45; 385/129; 385/130
(58) Field of Search ................................ 385/2, 3, 4, 8, 385/9, 10, 14, 16, 45, 129, 130

(56) References Cited

U.S. PATENT DOCUMENTS

| 5,267,336 | A | | 11/1993 | Sriram et al. |
| 6,120,597 | A | | 9/2000 | Levy et al. |
| 6,181,456 | B1 | * | 1/2001 | McBrien et al. ............ 359/245 |
| 6,192,167 | B1 | * | 2/2001 | Kissa et al. .................. 385/3 |
| 6,304,685 | B1 | * | 10/2001 | Burns .......................... 385/3 |
| 6,334,008 | B2 | | 12/2001 | Nakabayashi |
| 6,449,080 | B1 | * | 9/2002 | McBrien et al. ............ 359/245 |
| 6,479,979 | B1 | * | 11/2002 | Kingsley et al. ............ 324/96 |
| 6,504,640 | B2 | * | 1/2003 | Gopalakrishnan .......... 359/245 |
| 2001/0004410 | A1 | | 6/2001 | Kondo et al. |
| 2001/0007601 | A1 | | 7/2001 | Kondo et al. |

OTHER PUBLICATIONS

Osgood, Jr., et al, Epitaxial Liftoff for Fully Single–Crystal Ferroelectric Thin Films, U.S. Army Research Office, Annual Progress report, Contract No. N00173–98–1–G014 Jun. 1999.

Levy, M. et al., Fabrication of Single–Crystal Lithium Niobate films by Crystal Ion Slicing, Applied Physics Letters, vol. 73, No. 16, Oct. 19, 1998.

* cited by examiner

Primary Examiner—Akm E. Ullah
Assistant Examiner—Jennifer Doan
(74) Attorney, Agent, or Firm—Kremblas, Foster, Phillips & Pollick (57) ABSTRACT

An optical modulator has optical channels formed in a waveguide substrate in which two of the waveguide channel branches have reverse polarity relative to each other. In addition, the optical modulator has at least one of the following: 1) an electronic signal electrode and an electronic ground electrode are placed in proximity with opposite faces of the waveguide substrate, 2) a portion of said waveguide substrate is removed to afford a reduced electronic signal refractive index, and 3) the waveguide substrate has a fixing substrate attached to it with the refractive index of the fixing substrate lower than said refractive index of the waveguide substrate.

18 Claims, 5 Drawing Sheets

OPTICAL MODULATOR

CROSS REFERENCE TO RELATED APPLICATION

This application claims the benefit of U.S. Provisional Application 60/275,444 filed on Mar. 13, 2001, all of which are incorporated here by reference as if completely written herein.

BACKGROUND OF THE INVENTION

1. Field of the Invention

This invention pertains to fiber optics and to a device that impresses information on an optical carrier to be transmitted by an optical fiber. More particularly it relates to electro-optical modulator devices using Mach-Zehnder-type modulators in which the first and second branches of the waveguide have reverse polarity and which further have one or more of the following characteristics: 1) the electronic signal driving voltage of the modulator is substantially lowered, 2) the electronic signal propagation velocity is close to the velocity of the optical carrier, 3) the electric field of the electronic signal is uniform and produces a net overlap of unity with the optical wave.

2. Background of the Invention

Mach-Zehnder (M-Z) devices in which the first and second wave guide branches have reverse polarity was first demonstrated in U.S. Pat. No. 5,267,336 for electrode-less and lumped electrodes in push-pull configurations. To avoid the resistance-capacitance time constant, typically called the RC time constant, various workers have provided electrodes that operate in a transmission line type configuration rather than capacitor-type lumped electrode configuration. U.S. Pat. No. 6,334,008, all of which is incorporated herein by reference, illustrates the use of transmission-type electrodes with two waveguide branches having reverse polarity. Unfortunately, because the positive and negative electrodes carrying the electronic signal are arranged on the same face of the electro-optic crystal, the full effect of electronic signal electrical field is not experienced by the optical carrier. Rather it is only that portion of the electric field of the electronic signal that interacts with the optical carrier. Further, because the angular distribution of the electric field electronic signal is not uniform as it passes through the optical wave guide branches, the optical signal experiences a non-uniform electronic signal in each plane across (perpendicular to) the optical path in the optical wave guides. Such electric field distortion in the optical waveguides leads to decreased modulation bandwidth. Further because the traveling wave of the electronic signal travels within the electrode as well as in the optical waveguide substrate, it experiences a material refractive index (electronic signal refractive index) that is different from that experienced by the optical signal with results in differing propagation velocities for the electronic and optical signals. This results in further distortion of the optical signal and decreased modulation bandwidth.

Several references, U.S. Publication Nos. 2001/0004410 and 2001/0007601, and U.S. Pat. No. 6,120,597 have improved the match between a transmission-type electronic signal and the optical signal velocities by thinning the waveguide substrate and/or using adhesives and fixing substrates that bring the electronic signal refractive index closer to that of the optical signal. However, the electronic signal electrodes are placed on the same face of the optical waveguide substrate resulting in the less than optimal interaction of the electronic electric field with the optical signal noted above.

In view of the above deficiencies and in order to improve the operation of an MZ type optical modulator, it is an object of the present invention to increase the electric field strength across the waveguide portion of the waveguide substrate.

It is an object of the present invention to produce a net overlap of unity between the optical signal wave and the electric field of the electronic signal.

It is an object of the present invention to produce a M-Z device with increased phase modulation which increases intensity modulation.

It is an object of the present invention to provide better velocity matching between the electronic signal and the optical signal.

It is an object of the present invention to improve impedance matching with the electronic signal drive circuitry.

It is an object of the present invention to reduce electronic signal voltage ($V\pi$) as much as possible.

It is an object of the present invention to vary the refractive index in two waveguides of a M-Z device by using a single applied voltage.

It is an object of the present invention to vary the refractive index in two waveguides of a M-Z device without the use of a voltage inverter.

It is an object of the present invention to vary the refractive index in two waveguides of a M-Z device while reducing $V\pi$ below 80% of a single waveguide modified M-Z device while using a single driver with a single applied voltage without the use of an inverter circuit.

It is the object of the present invention to vary the refractive index in the two waveguides of a M-Z device in equal and opposite amounts to afford chirp free operation.

It is the object of the present invention to vary the refractive index of the two waveguides of a M-Z in arbitrary amounts to adjust the chirp factor of the device.

It is the object of the present invention to increase the transmission speed of the system by adjusting the chirp of the device.

It is the object of the present invention to increase the distance of the transmitted signal by adjusting the chirp of the device.

It is the object of the present invention to reduce the size of the electro-optical modulator.

It is the object of the present invention to increase the manufacturing yield from a starting wafer as a result of its reduced size.

It is an object of the present invention to improve the overall device stability.

The foregoing and other objects, features and advantages of the invention will become apparent from the following disclosure in which one or more preferred embodiments of the invention are described in detail. It is contemplated that variations in procedures may appear to a person skilled in the art without departing from the scope of or sacrificing any of the advantages of the invention.

SUMMARY OF THE INVENTION

To meet this objects, the present invention features 1 waveguide channels formed in a crystal substrate in which two of the waveguide channel branches have reverse polarity relative to each other. More specially the waveguide substrate have the following waveguide sections formed in a face of the waveguide substrate: 1) an input waveguide section for receiving an optical signal, 2) an input branching waveguide section for dividing the optical signal into a first portion and a second portion, 3) a first branch waveguide for transmitting the first portion of said optical signal; 4) a second branch waveguide for transmitting the second portion of said optical signal and having reverse polarity to that of the first branch waveguide, and 5) an output branching waveguide section for combining the first portion of the optical signal from the first branch waveguide and the second portion of the optical signal from the second branch waveguide to form an optical output signal. An electronic signal electrode and an electronic ground electrode are placed in proximity with the first branch waveguide and the second branch waveguide and oriented so as to produce an electric field in the first and second branch waveguides that affords an optical output signal that is proportional to the electric field. As used here the "term proximity with first and second branch waveguides means that the electrodes can be placed near to or in contact with the branch optical waveguides and includes embodiments in which the electrodes are placed on opposite sides of the waveguide substrate. In addition to the requirement that two of the branch waveguides have reverse polarity with respect to each other, the optical modulator further must have at least one of the following: 1) the electronic signal electrode and the electronic ground electrode must be placed in proximity with opposite faces of the waveguide substrate, 2) a portion of said waveguide substrate must be removed to afford a reduced electronic signal refractive index, and 3) the waveguide substrate must have a fixing substrate attached to it with the refractive index of the fixing substrate lower than said refractive index of the waveguide substrate. Any particular embodiment must have at least one of the three waveguide substrate arrangements. However, any particular embodiment is not limited to one of the arrangements and may include either one or two of the remaining the remaining arrangements. Portions of said waveguide substrate are removed by forming apertures in said waveguide substrate outside of the optical waveguide sections. These portions can be in the form of apertures or grooves. When a fixing substrate is attached to a face of the waveguide substrate it must have a refractive index lower than that of the waveguide substrate. The fixing substrate may be attached to the waveguide substrate directly or by using an adhesive. When an adhesive is used to join the fixing substrate to the waveguide substrate, the adhesive must have a refractive index lower than that of the waveguide substrate. The advantage of removing one or more portions of the waveguide substrate is that this affords a reduced electronic signal refractive index which in turn allows the electronic signal and the optical signal to propagate in the modulator at nearly the same velocity thereby affording. In the case where electrodes are formed on opposite faces of the waveguide substrate, neither the fixing substrate nor the adhesive serve to reduce the electronic wave refractive index. As such, any adhesive or fixing substrate may be used without regard to their refractive index properties. Typically the electronic signal and ground electrodes are formed in a transmission-type arrangement that accommodate a traveling wave electronic signal. In such a configuration, the electronic signal and ground electrodes are impedance matched with a load placed in parallel with said electronic signal and ground electrodes.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

Figure 1:
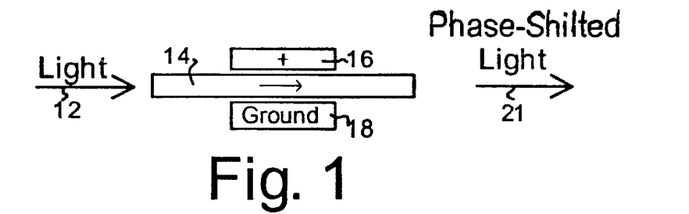
FIG. 1 is a schematic drawing illustrating an optical modulator that produces phase-shifted light by applying an electric potential to a single waveguide.
Figure 2:
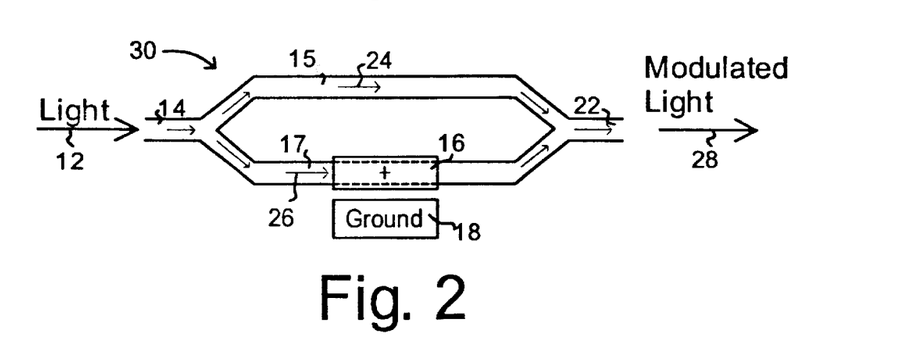
FIG. 2 is a schematic drawing illustrating an optical modulator that produces modulated light in a Mach-Zehnder device by applying an electric field to one of the branches of the device.

Generally two types of electro-optical modulators are currently in use, the phase modulator and the intensity modulator, which are shown generally in FIGS. 1 and 2. Both devices take advantage of the change in refractive index in a crystalline waveguide due to an applied voltage. In the optical, guided-wave phase modulator shown in FIG. 1, light 12 enters and travels along the waveguide 14 that has been placed between signal electrode 16 and ground electrode 18. An applied voltage at the signal electrode 16 introduces a change in the refractive index of the waveguide 14 which in turn alters the velocity of light passing through the waveguide causing a phase-shift in the emerging light 21 that is proportional to the applied voltage.

In FIG. 2, a guided-wave Mach-Zehnder (M-Z) interferometer intensity modulator 30 is used. Here light 12 enters waveguide 14 and is then split between two waveguide paths 15 and 17 and then joined again to leave via outlet guide 22. As with the phase-shifted device of FIG. 1, an applied potential to one of the guides, i.e., waveguide 17, produces a change in the refractive index of waveguide 17 that produces a phase-shift in the light 26 traveling in guide 17. When the phase-shifted light from guide 17 is summed with light 24 from guide 15, a loss of light intensity results due to destructive interference. The applied voltage at the signal electrode 16 regulates the magnitude of the output signal. Given the cosine squared characteristic of output light 28, an applied voltage that causes a phase shift of 180° ($\pi$ radians) will reduce the light intensity to a null value when the light from paths 15 and 17 are combined. This voltage is referred to as $V\pi$. Unless the guide is operating at the null voltage, modulated light 28 emerges from outlet guide 22.

Figure 3:
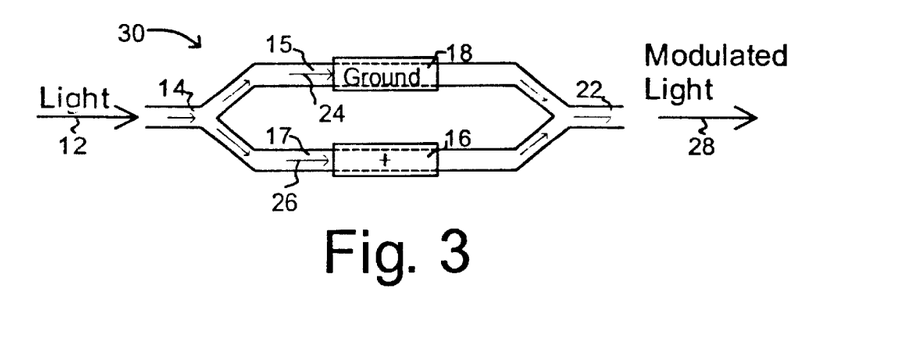
FIG. 3 is a schematic drawing illustrating an optical modulator that produces modulated light in a Mach-Zehnder device by applying a single electric field to both branches of the device. The field exists in opposite directions in each branch of the device.

As seen in FIG. 3, by placing the ground electrode 18 over one of the waveguides, e.g., 15, and the positive electrode over the other waveguide 17, it is possible to apply a single electric field to both waveguides. In such a configuration, the electric field will exist in opposing directions in the two waveguides 15, and 17. As a result, the refractive index in one of the paths will increase while that in the other will decrease causing a positive phase shift displacement in one of the light paths and a negative displacement in the other. By using such electrode placements, it is possible to reduce $V\pi$ by about 20 percent over that used in FIG. 2.

Figure 4:
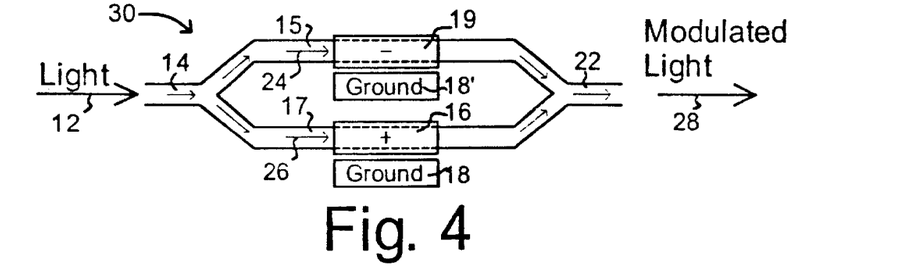
FIG. 4 is a schematic drawing illustrating an optical modulator in which two electric fields, each of opposite polarity, are applied to each of the branches of the device; that is, one electric field is applied to the first branch and the second field is applied to the second branch.

In FIG. 4, two voltage driver circuits are required. Here a positive voltage potential 16 is placed over waveguide 17 and a negative voltage 19 (relative to ground) placed over waveguide 15. The electric fields in the two optical channels 15, 17 are equal but opposite in direction. The refractive index and the phase change produced in the light paths under the positive and negative electrodes are also equal and opposite. Here the $V\pi$ voltage for each waveguide 15, 17 is approximately half that of $V\pi$ when a single voltage is applied to a single waveguide. Of course, the voltage differential applied to the device is still the same as the voltage applied to a single waveguide channel; however, the total voltage has been divided between two driver circuits with the effective voltage at each waveguide being half of the potential applied to a single waveguide channel. Here the improvement in $V\pi$ has come at the expense of using two driver circuits with one of the driver circuits typically having an inverter circuit in its output stage to provide the negative voltage potential.

Figure 5:
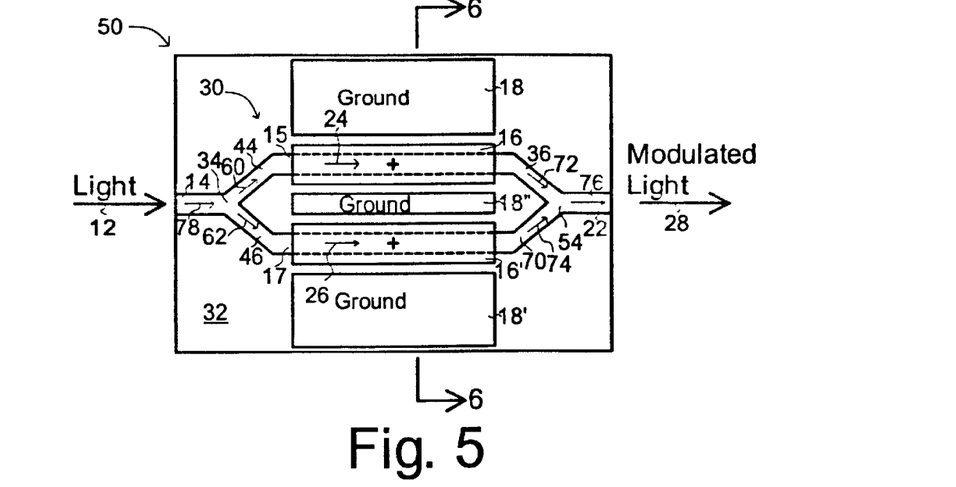
FIG. 5 is a schematic top view showing a Mach-Zehnder type interferometer according to the present invention in which a single electric field is applied to both branches of a device in which the optical waveguide branches are embedded in a crystalline substrate having opposite polarity in the region of each waveguide branch.
Figure 6:
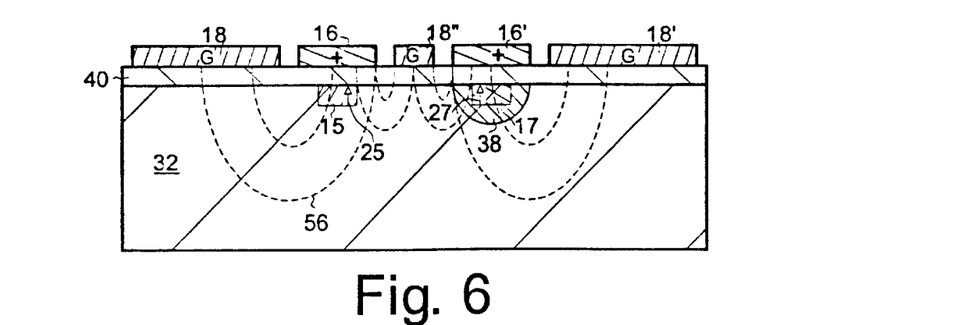
FIG. 6 is a cross sectional view of the device shown in FIG. 5 along line 6—6.
Figure 7:
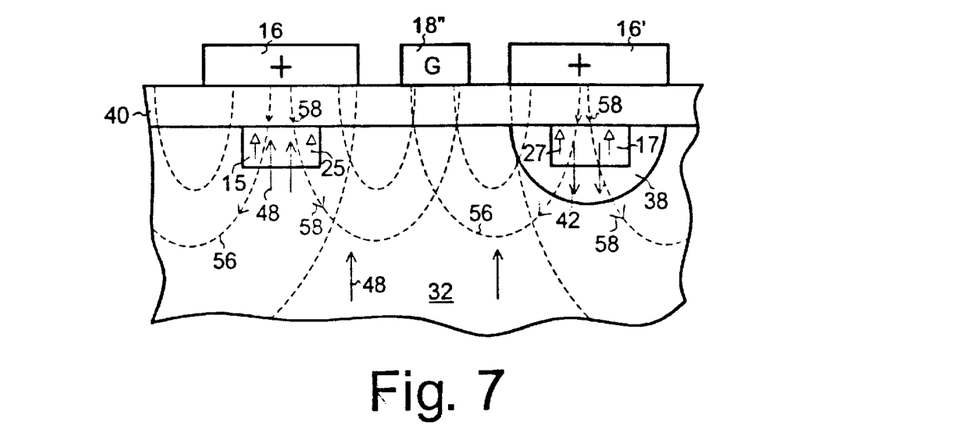
FIG. 7 is an enlarged portion of the cross sectional view of FIG. 6 detailing the electric field and crystal electro-optic tensor element in the normal and reversed poled crystal sections.

As shown in FIGS. 5–7, an optical modulator generally designated as 50 consists of an electro-optic substrate 32 such as crystalline lithium niobate into which is formed a Mach-Zehnder type interferometer 30. The interferometer 30 comprises input waveguide section 14, an input waveguide branching section (input splitter) 34 that divides the optical input 78 from the input waveguide section 14 into a first waveguide portion 44 and a second waveguide portion 46. A first waveguide branch 15 is formed in the crystalline substrate 32 and receives optical input from the first waveguide portion 44. A second waveguide branch 17 is formed in the crystalline substrate 32 and receives optical input from the second waveguide section 46. The second waveguide branch 17 is formed in a portion 38 (FIGS. 6 and 7) of the crystalline substrate 32 that has reverse polarity with respect to the portion of the crystalline substrate 32 in which the first waveguide branch 15 is formed.

As shown in FIG. 7, the electro-optic tensor element in the crystalline substrate 32 in which the first waveguide branch 15 is formed is designated by upward pointing arrows 48 while the reversed electro-optic tensor element in the portion 38 of the crystalline substrate 32 that has reverse polarity is designated by downward pointing arrows 42. The first and second waveguide branches 15, 17 are combined in an output combining section 54 and directed to output waveguide section 22.

The formation of waveguides and reverse polarity portions of crystalline materials is well-known and is shown, for example, in U.S. Pat. No. 5,267,336, all of which is incorporated by reference as if completely written herein. Typically the reverse polarity region 38 is created by diffusing a metal such as titanium into a portion of a crystal such as lithium niobate 32 using photolithographic techniques. The waveguide channels are created by proton exchange using an acid such as benzoic acid and suitable photolithographic techniques.

Positive electrodes 16, 16' are deposited on the surface of crystalline material 32 above each branched waveguide section 15 and 17. A ground electrode 18" is deposited between the two positive electrodes 16, 16'. Additional ground electrodes 18, 18' are placed adjacent to the positive electrodes 16, 16'. In order to avoid loss of light to the optically lossy electrode layers 16, 16', a layer of light retaining material 40 such as silicon dioxide is coated on the crystal 32 before depositing the electrode layer 16, 16'. The electrodes are typically formed from metal such as gold with the ground electrodes 18, 18', 18" formed over a large area to shield the device from high-frequency interference. A thin charge-bleed semiconductor layer (not shown) can be formed from, for example, silicon, and placed between the light retaining material 40 and the electrodes 16 and/or 18.

As shown in FIGS. 6 and 7 and especially FIG. 7, when a voltage is applied to the electrodes 16, 16', it produces an electric field 56 between the positive electrodes 16, 16' and ground electrodes 18, 18' and 18". As shown by arrows 58, electric field 56 moves into the crystal substrate 32 under the positive electrodes 16, 16' and out of the crystal substrate 32 under electrodes 18, 18' and 18". The electric field 56 changes the refractive index of the optical waveguides under positive electrodes 16 and 16'. Because the crystal electro-optic tensor element 42 in the region of the second waveguide branch 17 is opposite (reversed poled) to the crystal electro-optic tensor element 48 in the region of the first waveguide branch 15, the change in refractive index in the two branches is opposite to each other. Arrows 25 and 27 represent the electro-optical field, that is, the electric field of the optical wave passing through waveguides 15 and 17, respectively.

Referring to FIGS. 5–7 and especially to FIG. 5, light 12, typically from a laser source such as a laser diode, enters input waveguide section 14 where it travels to branching waveguide section 34 where it is split into two paths, first waveguide portion 44 and second waveguide portion 46. The light 62 in second waveguide portion 46 travels into waveguide branch 17 where at least a portion of waveguide branch 17 is subjected to an electric field 56 from the positive signal electrode 16'. Simultaneously, light 60 in first waveguide portion 44 travels into wave guide branch 15 where at least a portion of waveguide branch 15 is subjected to electric field 56 from positive signal electrode 16. The effect of the electric field from the electrode, i.e., 16 and 16', is opposite in each wave guide branch 15 and 17 due to the reverse poling of waveguide 17 in crystal region 38 (FIGS. 6 and 7). Light 72 enters first output waveguide portion 36 from first waveguide branch 15 while light 74 enters second output waveguide portion 70 from second waveguide branch 17 and, before it reaches output waveguide 22, the light 72, 74 is combined (summed) in combining waveguide section 54 where light portions 72, 74 undergo phase interference with each other and either reinforce or cancel each other depending on the phase angle shift produced in waveguide branches 15 and 17 due to the change in refractive index caused by the applied voltage. The resulting light 76 (or lack thereof when the light in waveguide branches 15 and 17 cancel each other) leaves the waveguide outlet 22 as modulated light 28.

The net effect of the unique electrode arrangement in conjunction with the use of a reverse poled section 38 of an electro-optic substrate 32 for one waveguide branch 17 and the electro-optic substrate 32 itself for the other waveguide branch 15, allows the minimum applied electrical potential to cause complete cancellation of the light from the two waveguide branches (V$\pi$) to be reduced by up to 50% over that found in prior art devices when an electrical potential is applied to a single waveguide branch or 38% over prior art devices that placed a positive (or negative) electrode over one waveguide branch and the ground electrode over the other branch. In the instance where a negative electrode was applied to one branch and a positive electrode to the other branch, the arrangement of the current invention eliminates the need for two voltage drivers or, at a minimum, a single voltage driver with an inverting circuit.

Unequal voltages may be applied to the waveguides of the M-Z device of FIG. 5 to adjust the chirp parameter of the device to compensate for the effects of the optical fiber medium. Voltages to the waveguides may be adjusted by introducing amplifiers or attenuators between the electrical drive circuit and the electrodes on the M-Z device.

Figure 8:
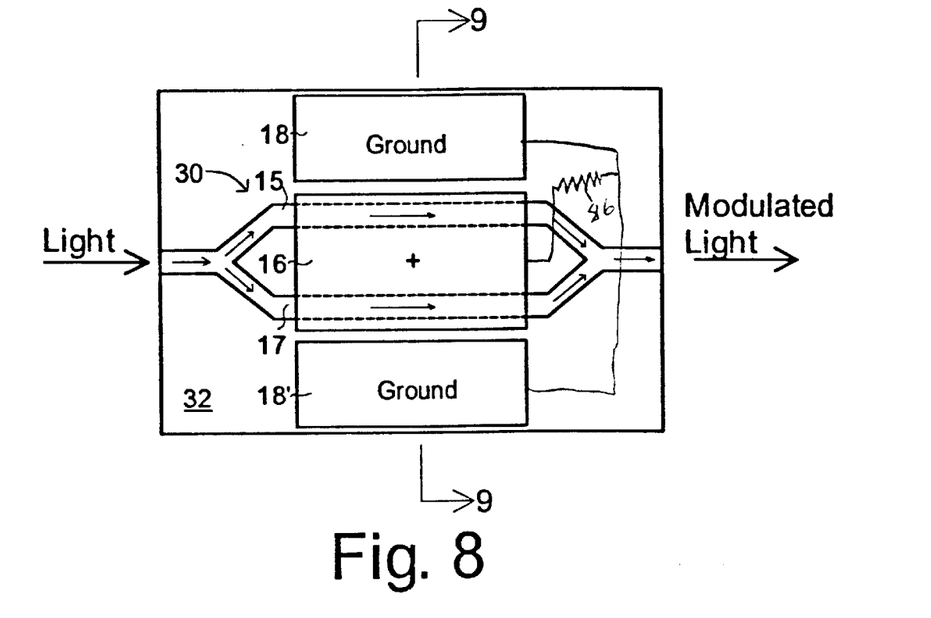
FIG. 8 is a schematic top view illustrating another embodiment of a Mach-Zehnder type interferometer according to the present invention in which a single electric field is applied to both waveguide branches of a device in which the optical waveguide branches are embedded in a crystalline substrate having opposite polarity in the region of each waveguide branch by using a single positive electrode.
Figure 9:
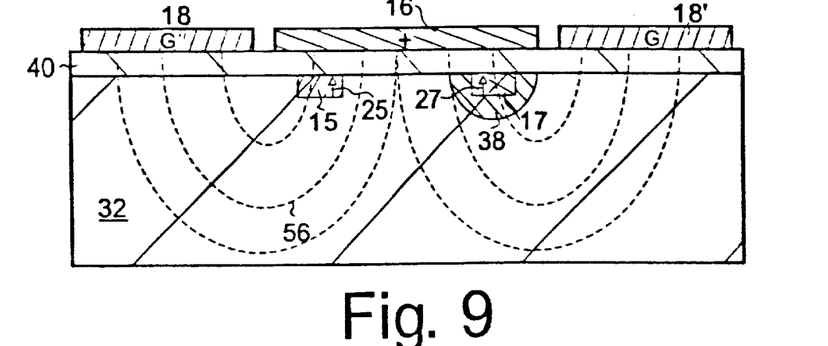
FIG. 9 is a cross sectional view of the device shown in FIG. 8 along line 9—9.

FIGS. 8 and 9 illustrate an embodiment in which the center (signal) electrode 16 covers both optical waveguide paths 15 and 17. A single driver produces an electrical field 56 in both paths that affords equal and opposite phase shifts in the optical beams in the two light paths. The device of this configuration offers a simplified connection between the driver circuit and the electrode on the Mach-Zehnder device. Since the voltage applied to the two waveguides is equal producing equal and opposite phase shifts in the waveguide paths, this device configuration provides a zero chirp device.

Figure 10:
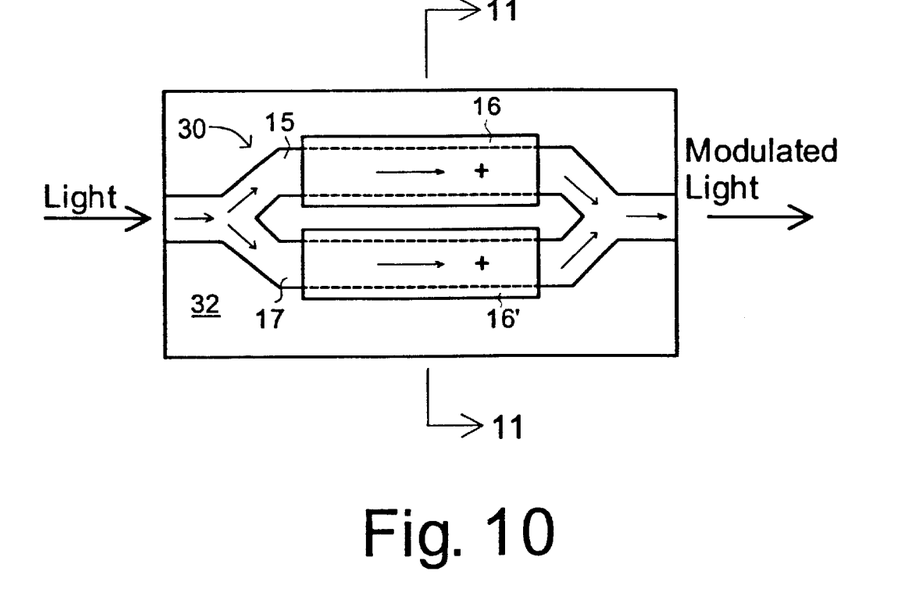
FIG. 10 is a schematic top view showing a Mach-Zehnder type interferometer according to the present invention in which a single electric field is applied to both branches of a device in which the optical waveguide branches are embedded in a crystalline substrate having opposite polarity in the region of each waveguide branch. The ground electrode is placed on the opposite side of the crystal substrate parallel to the signal electrode.
Figure 11:
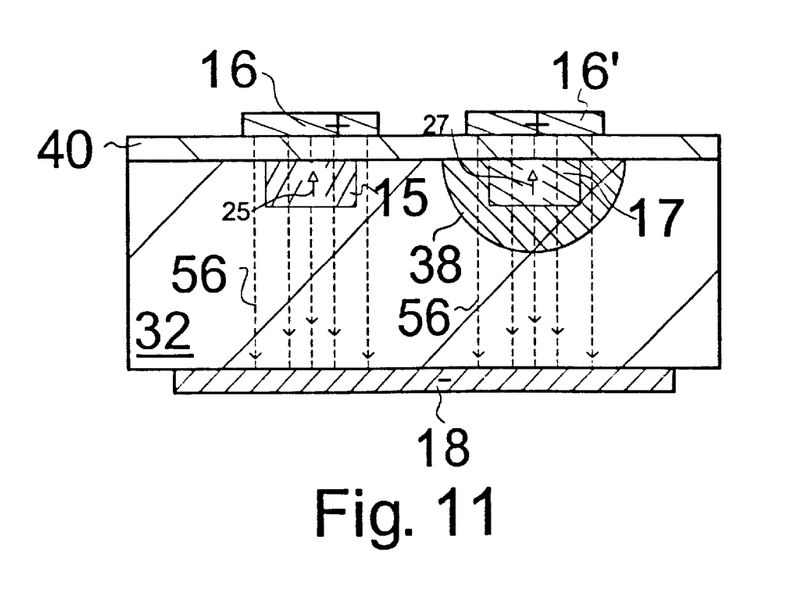
FIG. 11 is a cross section view of the device shown in FIG. 10 along line 11—11.

Devices of FIGS. 10 and 11 incorporate the ground electrode 18 on the bottom surface of crystal 32. This configuration offers two additional features that afford at least two additional advantages. First, placement of the ground electrode 18 on the opposite side of crystal 32, i.e., opposite signal electrodes 16 and 16' results in an electric field 56 that passes in a straight line though crystal 32 rather than the curved field 56 shown in FIGS. 6, 7, and 9 when the ground and signal electrodes are placed next to each other on the same side of crystal 32.

This results in increased efficiency of the modulator due to the near perfect interaction between the optical electric field and the electric field from the voltage source. This configuration of electrodes increases the overlap of the electrical fields 25 and 27 created by the optical light signal to about 100 percent since the overlap is proportional to the product of the optical electric field (25 and/or 27) and the z-component 56 of the electrical electric field. A vertical electrical electric field 56 and a vertical optical electric field 25, 27 result in a net overlap of 1 (FIG. 11) while a horizontal electric field and a vertical optical electric field would result in a net overlap of 0. An overlap of 1 gives maximum phase change. The device of FIGS. 8 and 9 exhibit a 30 to 50% overlap since the electrical field produced by the signal electrodes and the optical field of the light in the waveguides no longer are completely aligned with each other.

Another advantage of the electrode arrangement in FIGS. 10 and 11 is that the area occupied by the ground electrode on the crystal surface can be eliminated. As a result, the width of the crystal may be reduced from about 10 mm to about 2 mm. This, of course, significantly increases the number of crystals that can be obtained from a starting wafer. In addition, recent grinding and slicing techniques such as those found in U.S. Pat. Pubs. 2001/0004410 and 2001/0007601 and U.S. Pat. No. 6,334,008, each of which is incorporated by reference as if completely written herein, allow for the fabrication of very thin layered films (10–30 $\mu$m) of wave guide substrate 32. Such thin substrate layers produce a high electric field strength across the waveguide material which results in increased phase modulation and a low switching voltage. As noted above, the electric field 56 is uniform, well-confined in the waveguide regions 15 and 17, and produces a net overlap of unity between the optical wave fields 25, 27 and the electrical field 56.

As is recognized by those skilled in the art, the configurations shown in the figures are also compatible with and preferably used with electronic traveling waves. When used in a lumped-electrode configuration, i.e., the electrodes 16, 16' and 18 in FIG. 11 act as a capacitor, the resistance-capacitance (RC) time constant produces a severe limitation on the modulation frequency. As such, rather than use the lumped configuration, electrodes 16, 16' and 18 are used to conduct the electronic signal in a transmission mode type operation, that is, rather than charge accumulating on the electrodes 16, 16' and 18 in FIGS. 10 and 11 in a capacitor-like fashion, the electronic signal merely passes along the electrode as though the electrodes are a part of the transmission line. Such a configuration is referred to by those skilled in the art as a traveling electronic wave optical modulator (see, for example, U.S. Pat. Pub. 2001/0004410). In the traveling electronic wave optical modulator, the electric field 56 produced by the electronic signal moves in the same direction as the light 24, 26 traveling in the wave guide branches 15, 17, respectively (e.g., see FIG. 5). As seen in FIG. 11, the lower ground electrode 18 lies beneath both channel waveguides 15 and 17 while the positive electrode consists of two separated positive electrodes 16, 16' that can be driven in parallel or independently. Such a configuration serves to minimize the electrode capacitance and increase its characteristic impedance. Traveling electronic wave modulators are typically impedance matched by placing a load (resistor) 86 in parallel with the ground and positive electrodes (FIG. 8).

In a traveling electronic wave modulator, the moving electric field 56 tends to move at a slightly different velocity than the light traveling in optical waveguides 15 and 17. The traveling electric field experiences a material refractive index (electronic signal refractive index) that is different, typically larger than, the material refractive index experienced by the optical signal. Ideally, the electronic and optical signals should have the same propagation velocities so that the optical signal can experience a constant (unvarying) electrical signal as it travels along the waveguide. Because the electronic and optical signals have different propagation velocities, the optical signal experiences differing electrical fields as it moves down the optical waveguide resulting in distortion of the optical signal and decreased modulation bandwidth. To overcome this distortion, portions of the waveguide substrate are removed to afford a reduced electronic signal refractive index experienced by the electrical signal. In effect, the electronic signal refractive index now has a greater air component which reduces the electronic signal refractive index and allows the electronic signal to propagate at a higher velocity that is closer to the propagation velocity of the optical signal. This of course increases the modulation bandwidth. In addition, the introduction of air into the waveguide substrate reduces its effective dielectric constant which increases the impedance and provides better impedance matching.

Figure 12:
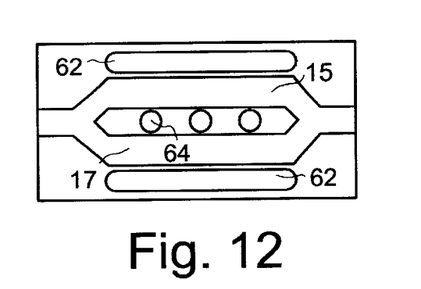
FIG. 12 is a top view of a optical waveguide substrate in which portions of the substrate have been removed by form oblong apertures in the substrate perpendicular to the plane of the optical wave guide.
Figure 13:
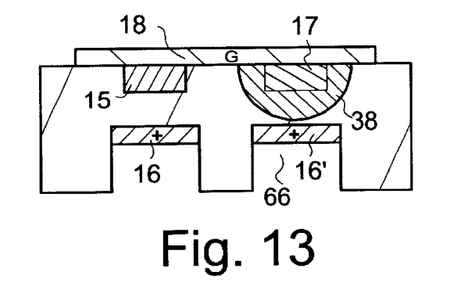
FIG. 13 is a cross-sectional view of a optical waveguide substrate in which portions of the substrate have removed by forming grooves in the underside of the substrate.

As seen in FIG. 12, oblong apertures 62 can be bored through the waveguide substrate to decrease its electronic signal refractive index or, as seen in FIG. 13 grooves 66 can be cut into the under side of the waveguide substrate. Typically the waveguide substrate removal should be done in such a manner as to afford a constant electronic signal refractive index as the electronic signal propagates down the electrode path. As such, grooves, holes, or other apertures that are transverse to the propagation direction of the electronic signal are less preferred. The present invention contemplates removal of a portion of the waveguide substrate in a variety of ways to afford a reduced electronic signal refractive index. As such, FIGS. 12 and 13 are not limiting and serve merely to illustrate some of the ways in which portions of the waveguide substrate may be removed.

Figure 14:
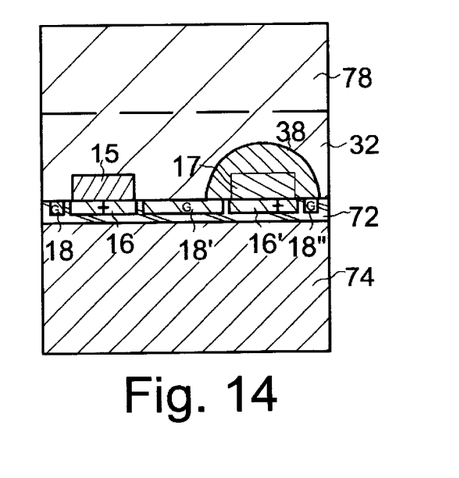
FIG. 14 is a cross-sectional view of a thin optical waveguide substrate (10–20 $\mu$m thick) having all electrical ground and signal electrodes formed on the same face of the optical waveguide substrate and having a fixing substrate attached to the electrode face with adhesive. The thin optical waveguide substrate is formed by removing a portion of the waveguide substrate away from the substrate face on which said electrodes are formed.
Figure 15:
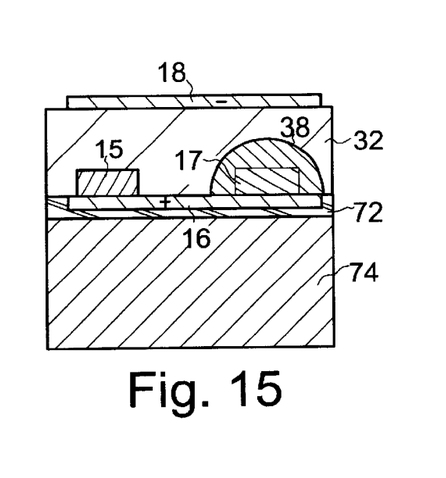
FIG. 15 is a cross-sectional view of a thin optical waveguide substrate formed by removing a portion of the optical waveguide substrate and having the ground and positive electrode formed on opposite faces of the waveguide substrate with a fixing substrate attached to the waveguide substrate face having the positive electrode with adhesive material.

FIGS. 14 and 15 illustrate other embodiments of the present invention in which a fixing substrate 74 is used in conjunction with a thin waveguide substrate to lower the electronic signal refractive index refractive index experienced by the propagating electronic signal. In FIG. 14, waves guides 15 and 17 are formed in a waveguide substrate 32 with wave guide 17 having reverse polarity 38. Traveling wave electrodes 16, 16', 18, 18' and 18" are affixed to the waveguide substrate as also shown in FIG. 6. A fixing substrate 74 is then affixed to the waveguide substrate 32 and the traveling wave electrodes 16, 16', 18, 18', and 18" as shown in FIG. 14. The fixing substrate 74 may be affixed directly to the face of waveguide substrate 32 and to the electrodes, or as shown, a suitable adhesive 72 may be used to attached the fixing substrate 74. After the fixing substrate is attached, a portion 78 of the waveguide substrate is removed from the face of the waveguide substrate opposite the face on which the electrodes 16, 16', 18, 18', and 18" and optical waveguides 15 and 17 are formed. The waveguide substrate portion 78 may be removed through the use of grinding and laser working techniques of Kondo et al (US Pat. Pub. Nos. 2001/0004410 and 2001/0007601). In such a configuration, the refractive index and dielectric constant of the adhesive and fixing substrate are less than those of the waveguide substrate. As a result of this configuration, it is readily apparent that a goodly portion 78 of the waveguide substrate has been removed and thus replaced with air while adhesive 72 and fixing substrate 74 are of a refractive index and dielectric constant less than that of the waveguide substrate 32. As a consequence, the effective electronic refractive index experienced by the electronic traveling wave increases its propagation velocity and brings it closer to the optical velocity. As a result, such an arrangement affords increased modulation bandwidth and better impedance matching. It is to be particularly noted that other layers found in the waveguide and electrode configuration should also have a refractive index less than that of the waveguide substrate 32. Thus the layer of light retaining material 40 placed between the electrodes and waveguide substrate should also have a refractive index and dielectric constant less than that of the waveguide substrate 32.

FIG. 15 is another embodiment illustrating the use of a fixing substrate. In this instance a thin layer of waveguide substrate 32 having the requisite optical wave guides 15 and 17 with waveguide 17 having reverse polarity 38 and a single positive traveling wave electrode 16 extending over both waveguide channels 15, 17 is affixed to fixing substrate 74 either directly or by means of an adhesive layer 72. A ground electrode 18 is affixed on the face opposite to the wave guide crystal face on which the positive traveling wave electrode is formed. In the embodiment of FIG. 15, it is not necessary that the adhesive or the fixing substrate have a refractive index less than that of the waveguide substrate since the effective electrical field is contained between the positive and ground electrodes.

Another feature of the operation of an optical modulator with a waveguide branch 15 having a polarity opposite the other waveguide branch 17 is that frequency chirp, which is common to most lasers and crystal substrates, is eliminated. Another advantage of operating each of the legs in opposite polarity is a reduction of the signal electrode voltage to a half what is commonly found when the legs are not operated in opposite polarity. This affords the advantage of creating an optical modulator operating at reduced voltage level with a transmission speed beyond 10 Gigabits per second with a transmission speed of 40 Gigabits per second becoming possible.

Finally it is to be realized that it is possible that changes in configurations to other than those shown could be used but that which is shown is preferred and typical. Without departing from the spirit of this invention, various electro-optical crystals, electrodes, light sources, and waveguide production methods may be used. It is therefore understood that although the present invention has been specifically disclosed with the preferred embodiment and examples, modifications to the design concerning sizing, shape, and arrangement will be apparent to those skilled in the art and such modifications and variations are considered to be equivalent to and within the scope of the disclosed invention.

What is claimed is:

1. An optical modulator comprising:

a) a waveguide substrate having formed in a face thereof:

b) an input waveguide section for receiving an optical signal;

c) an input branching waveguide section for dividing said optical signal into a first portion and a second portion;

d) a first branch waveguide for transmitting said first portion of said optical signal;

e) a second branch waveguide for transmitting said second portion of said optical signal and having reverse polarity to that of said first branch waveguide;

f) an output branching waveguide section for combining said first portion of said optical signal from said first branch waveguide and said second portion of said optical signal from said second branch waveguide to form an optical output signal;

g) an electronic signal electrode and an electronic ground electrode placed in proximity with said first branch waveguide and said second branch waveguide and oriented so as to produce an electric field in said first and second branch waveguides that affords an optical output signal that is proportional to said electric field; and h) said optical modulator further comprising at least one of the following:
  1) said electronic signal electrode and said electronic ground electrode placed in proximity with opposite faces of said waveguide substrate;
  2) a portion of said waveguide substrate removed to afford a reduced electronic signal refractive index;
  3) a fixing substrate attached to said waveguide substrate with a refractive index lower than said refractive index of said waveguide substrate.

2. The optical modulator according to claim 1 wherein said electronic signal electrode and said electronic ground electrode are placed in proximity with said opposite faces of said waveguide substrate.

3. The optical modulator according to claim 2 wherein said refractive index of said waveguide substrate is reduced by removing portions thereof between said electronic signal and ground electrodes.

4. The optical modulator according to claim 3 wherein said portions of said waveguide substrate are removed by forming apertures in said waveguide substrate outside of said waveguide sections.

5. The optical modulator according to claim 2 further comprising a fixing substrate attached to said face of said waveguide substrate containing said optical wave guide sections and having a refractive index lower than that of said waveguide substrate.

6. The optical modulator according to claim 5 further comprising an adhesive for bonding said fixing substrate to said waveguide substrate, said adhesive having a refractive index lower than that of said waveguide substrate.

7. The optical modulator according to claim 1 wherein a portion of said waveguide substrate is removed to afford a reduced electronic signal refractive index.

8. The optical modulator according to claim 7 wherein said portions of said waveguide substrate are removed by forming apertures in said waveguide substrate outside of said waveguide sections.

9. The optical modulator according to claim 7 further comprising a fixing substrate attached to said face of said waveguide substrate containing said optical wave guide sections and having a refractive index lower than that of said waveguide substrate.

10. The optical modulator according to claim 9 further comprising an adhesive for bonding said fixing substrate to said waveguide substrate, said adhesive having a refractive index lower than that of said waveguide substrate.

11. The optical modulator according to claim 1 further comprising a fixing substrate attached to said waveguide substrate, said fixing substrate having a refractive index lower than that of said waveguide substrate.

12. The optical modulator according to claim 11 further comprising an adhesive for bonding said fixing substrate to said waveguide substrate, said adhesive having a refractive index lower than that of said waveguide substrate.

13. The optical modulator according to claim 11 wherein a portion of said waveguide substrate is removed to afford a reduced electronic signal refractive index.

14. The optical modulator according to claim 13 wherein said portions of said waveguide substrate are removed by forming apertures in said waveguide substrate outside of said waveguide sections.

15. The optical modulator according to claim 11 wherein said fixing substrate is attached to the face of said waveguide substrate having said waveguide sections formed therein.

16. The optical modulator according to claim 11 wherein said electronic signal electrode and said electronic ground electrode are placed in proximity with opposite faces of said waveguide substrate.

17. The optical modulator according to claim 1 wherein said electronic signal and ground electrodes accommodate a traveling wave electronic signal.

18. The optical modulator according to claim 1 wherein said electronic signal and ground electrodes are impedance matched with a load placed in parallel with said electronic signal and ground electrodes.

* * * * *